Jan. 11, 1972 M. C. YOUNG Re. 27,272
METHOD OF DETERMINING DIRECTION AND VELOCITIES OF FLUID FLOW INTO A WELL BY MEANS OF RADIOACTIVE TRACER INTRODUCTION INTO THE WELL
Original Filed Aug. 19, 1964 5 Sheets-Sheet 1
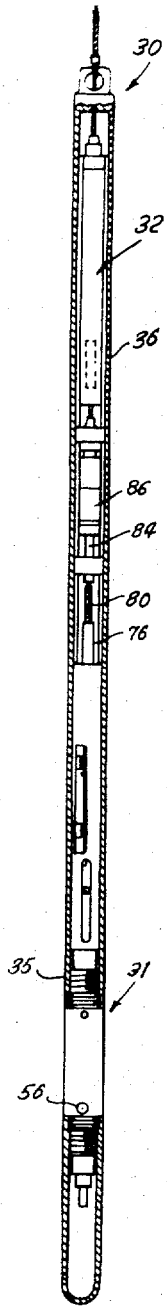
Fig. 1
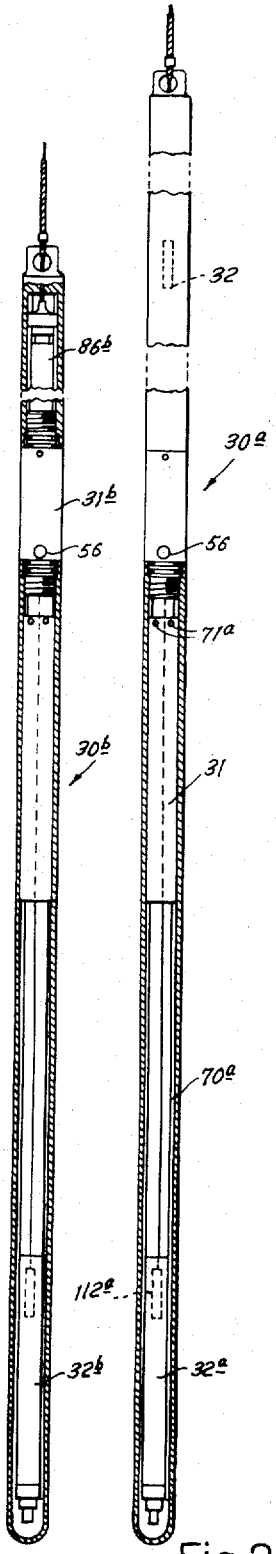
Fig. 1A
Fig. 2
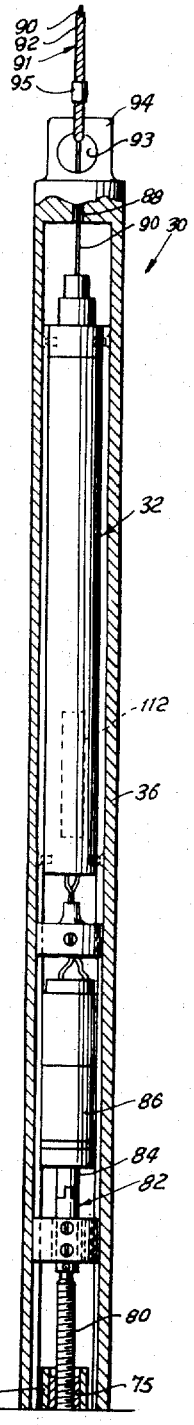
Fig. 3
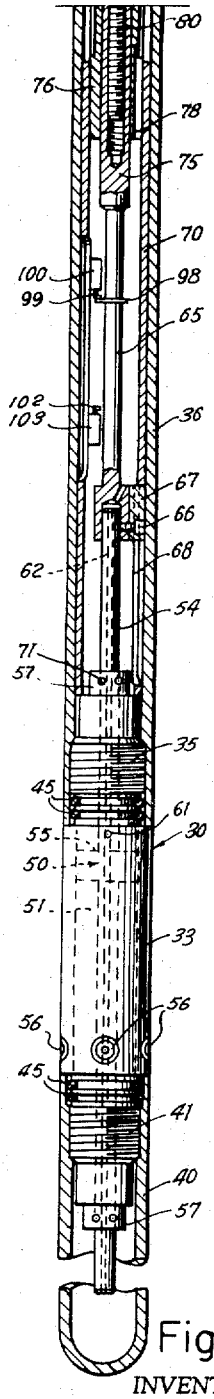
Fig. 4
INVENTOR
Marcus C. Young
BY Hastings Ackley
ATTORNEY METHOD OF DETERMINING DIRECTION AND VELOCITIES OF FLUID FLOW INTO A WELL BY MEANS OF RADIOACTIVE TRACER INTRODUCTION INTO THE WELL Original Filed Aug. 19, 1964 5 Sheets-Sheet 2

INVENTOR
Marcus C. Young

BY Kesterings Ackley

ATTORNEY

METHOD OF DETERMINING DIRECTION AND VELOCITIES OF FLUID FLOW INTO A WELL BY MEANS OF RADIOACTIVE TRACER INTRODUCTION INTO THE WELL
Original Filed Aug. 19, 1964 5 Sheets-Sheet 5
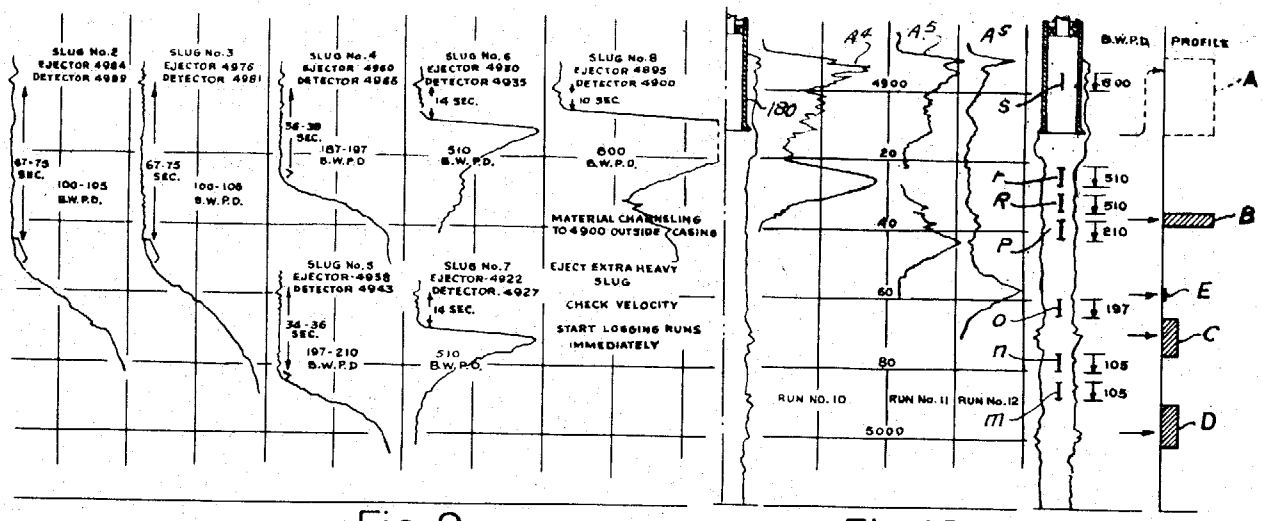
Fig. 9
Fig. 10
Fig. 11
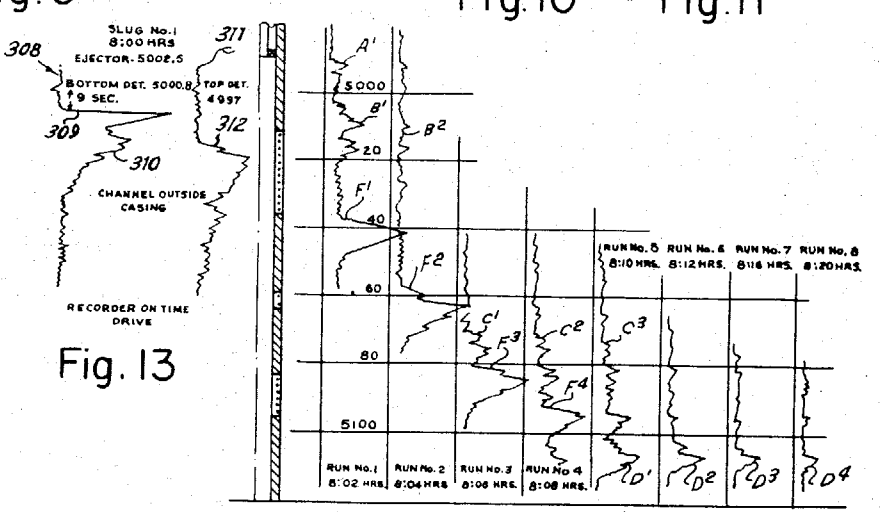
Fig. 13
Fig. 14
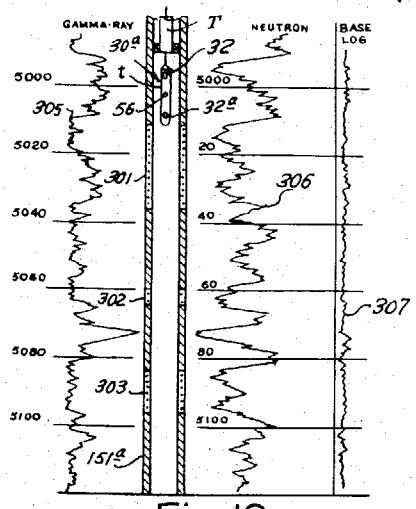
Fig. 12
INVENTOR
Marcus C. Young
BY Cassasturgis Ackley
ATTORNEY INVENTOR
Marcus C. Young BY Eastings Ashley

ATTORNEY

METHOD OF DETERMINING DIRECTION AND VELOCITIES OF FLUID FLOW INTO A WELL BY MEANS OF RADIOACTIVE TRACER INTRODUCTION INTO THE WELL

Original Filed Aug. 19, 1964 5 Sheets-Sheet 5

INVENTOR
Marcus C. Young

BY Kastings Ackley

ATTORNEY

United States Patent Office

Re. 27,272
Reissued Jan. 11, 1972

27,272

METHOD OF DETERMINING DIRECTION AND VELOCITIES OF FLUID FLOW INTO A WELL BY MEANS OF RADIOACTIVE TRACER INTRODUCTION INTO THE WELL

Marcus Conway Young, Odessa, Tex., assignor to Cardinal Surveys Company, Odessa, and Well Reconnaissance, Inc., Dallas, Tex., fractional part interest to each Original No. 3,406,284, dated Oct. 15, 1968, Ser. No. 390,590, Aug. 19, 1964. Application for reissue Apr. 6, 1970, Ser. No. 26,177

Int. Cl. G01v *5/00*

U.S. Cl. 250—43.5 FC 16 Claims

Matter enclosed in heavy brackets [ ] appears in the original patent but forms no part of this reissue specification; matter printed in italics indicates the additions made by reissue.

This invention relates to methods of subsurface explorations of the earth and more particularly to a method for investigating the flow of fluids within a well and subsurface earth formations or zones penetrated by the well.

An object of this invention is to provide a new and improved method for investigating the flow of fluids within a well and subsurface formations penetrated by the well by injecting and detecting the direction of flow of the injected materials in the well and subsurface formations penetrated by the well.

Still another object is to provide a new and improved method for investigating the flow of fluids introduced into a well and into subsurface formations penetrated by the well which includes the step of determining the velocities of flow of the injected water above and below the locations of outward flow thereof from the well.

Still another object is to provide a new and improved method for investigating the flow of water continuously introduced into the well and from the well into subsurface formations in order to stimulate the production of well fluids by another well or wells spaced from the well into which the water is being introduced.

A further object is to provide a new and improved method for determining the directions and velocities of flow of water into a well by continuously introducing the water into the well at a predetermined constant rate for a period of time sufficiently long to cause stabilization of flow of water from the well into the earth formations penetrated by the well, positioning a detection device for detecting a tracer material, such as a radioactive material, at a predetermined location in the well, ejecting a quantity or slug of radioactive material into the well at a predetermined location spaced from the location of the detector device, determining the period of time necessary for the tracer material to move from the point of ejection to the detector device; moving the detector device through the slug of ejected tracer material at predetermined time intervals and recording the radiation detected by the detector device during such movement to determine the locations of outward flow of the radioactive material from the well into earth formations penetrated by the well.

A still further object is to determine the velocity of flow of the fluids in the well above and below the locations of outward flow of the water from the well into earth formations to permit the rate of flow of the water into such formations to be calculated.

Another object is to provide a new and improved method for investigating a flow introduced into a well through the well and into formations penetrated by the well which includes the positioning in the well a pair of vertically spaced detector devices for detecting a tracer material, such as a radioactive material, introducing a quantity or slug of the tracer material between the two detector devices determining the period or periods of time necessary for the radioactive material to move past one or both of the detector devices to determine the direction and velocity of flow of the ejected tracer material after its ejection into the well.

Still another object is to provide a method of investigating the flow of fluids in the well which includes a subsequent step of moving a detector device vertically in the well through the ejected radioactive material at predetermined time intervals and recording the radiation detected thereby to determine the locations of outward flow of the ejected radioactive material from the well into earth formations, and thereafter ejecting subsequent slugs of radioactive material into the well above each location of outward flow of the fluids from the well to determine and measure the time necessary for the radioactive material to reach the detector device to determine the velocity of flow of the ejected material at each location to permit calculation of the rates of flow of the fluids into each such formation.

Additional objects and advantages of the invention will be readily apparent from the reading of the following description of a device constructed in accordance with the invention, and reference to the accompanying drawings thereof, wherein:

FIGURE 1 is a vertical partly sectional view of an apparatus by means of which the method of the invention may be practiced;

FIGURE 1A is a vertical partly sectional view of another apparatus by means of which the method of the invention may be practiced;

FIGURE 2 is a vertical partly sectional view of another apparatus by means of which the method of the invention may be practiced;

FIGURE 3 is an enlarged vertical partly sectional view of the upper portions of the apparatus illustrated in FIGURE 1;

FIGURE 4 is a view, similar to FIGURE 3 being a continuation thereof, of the lower portions of the apparatus of FIGURE 3;

FIGURE 9 shows the time-radioactivity charts of the adiation detected by the detector device at various pre-etermined locations in the well at which successive slugs f radioactive material have been injected into the well by he apparatus;

FIGURE 10 is a depth-radioactivity chart showing the ecordings of the radioactivity detected by the apparatus uring movement of the apparatus through the last slug fter its injection into the well;

FIGURE 11 is a schematic chart showing locations of arious formations into which water is flowing outward rom the well and the rates of flow of water in the well at arious locations of the well and into the earth forma-ons;

FIGURE 12 is a schematic view of a well having a asing provided with a plurality of vertically spaced per-orations and showing the gamma ray and neutron logs of ie portion of the well, the view also showing the appara-is illustrated in FIGURE 2 positioned in the well;

FIGURE 13 is a time radioactivity chart showing the adioactivity detected by the detectors of the apparatus uring a predetermined interval of time after the injection f the radioactive material into the well;

FIGURE 14 is a depth-radioactivity chart showing the adiation detected by one of the detector devices during iovement thereof through the slug of radioactive material reviously ejected into the well;

Figures 5, 6, 7, 8:
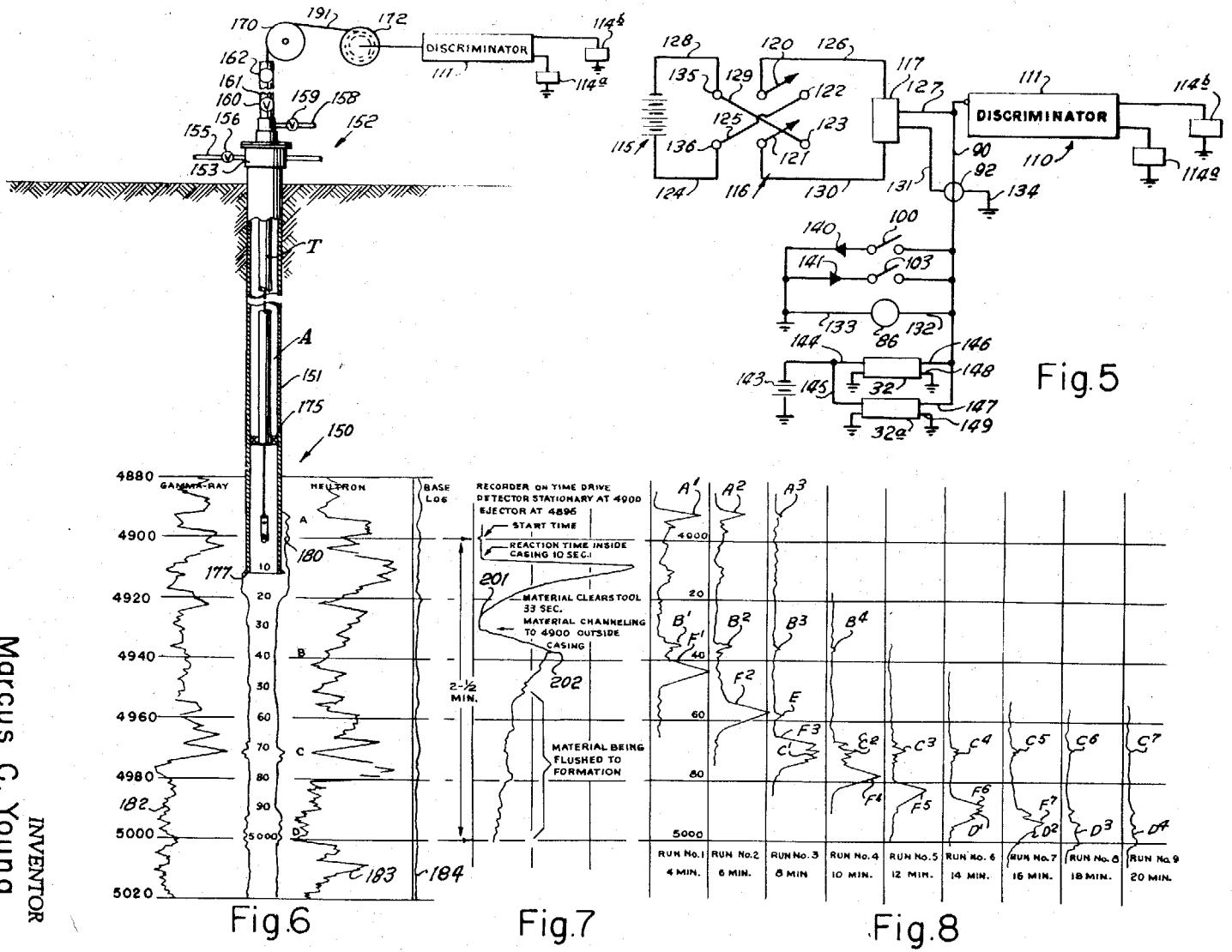
FIGURE 5 is a schematic diagram of the electric circuit of the apparatus illustrated in FIGURE 2.
FIGURE 6 is a schematic view of a well and the surface equipment by means of which the apparatus of FIGURE 1A is movable in the well, and showing the gamma ray and neutron logs of the portion of the well in which the flow of water injected into the well is to be investigated.
FIGURE 7 is a time-radioactivity chart showing the radioactivity detected by the radiation detector device of the apparatus of FIGURE 1A during a period of time after a slug of radioactive material has been ejected by the detector device into a well a predetermined distance thereabove.
FIGURE 8 is a depth-radiation chart showing the re[cording] *cordings* of the radioactivity detected by the detector device at predetermined time intervals during movement of the apparatus through the ejected slug of radioactive material.

An injector and detector apparatus 30 by means of hich the method of the invention may be practiced [,] is lustrated in FIGURES 2, 3, 4 and 5 of the drawing. This pparatus is fully described and illustrated in the applica-on for United States Letters Patent of Robert Mayer, ., and Marcus C. Young, Ser. No. 369,162 filed the 1st day of May 1964, *now Patent No. 3,395,277, dated ly 30, 1968,* and, therefore, will not be described in de-il herein.

Referring now particularly to FIGURES 1, 3 and 4 of ie drawing, the injector and detector apparatus 30 in-udes an injector device 31 and a radiation detector evice 32. The injector device includes a pump cylinder 3 having an externally threaded upper end portion 35 hich extends into and is connected to a top housing sec-on 36. A bottom housing section 40 is threaded on the ower threaded reduced end portion 41 of the pump cylin-er. The pump cylinder is provided at each end, inwardly the threaded reduced end portions 35 and 41, with a air of annular recesses in which are disposed O-rings 45 hich seal between the pump cylinder and the top and ottom housing sections.

A pump piston 50 is mounted in the longitudinal pas-ge 51 of the pump cylinder for limited longitudinal iovement therein. The pump cylinder is provided with ppropriate seal means (not shown) for sealing between ie cylinder and the piston rod 54 above the piston flange 5 and below the piston flange and a plurality of check alves 56 which control flow of fluids from and into the ump cylinder below the piston flange 55. The seal means e held against displacement by retainer nuts 57 threaded ito opposite ends of the piston cylinder.

When the pump piston is in the uppermost position in the pump cylinder illustrated in FIGURE 4, the piston flange 55 is located immediately below a plurality of lateral ports 61 of the pump cylinder which permit entry and exhaust of fluids from the passage 51 of the pump cylinder above the piston flange during movement of the piston in the pump cylinder. One or more of the check valves permit fluid from within the pump cylinder passage 51 below the flange 54 to flow outwardly therefrom when the pump piston moves downwardly and exerts a predetermined pressure on the fluid in the pump cylinder and one or more of the check valves permit entry of the fluids from the exterior of the pump cylinder into the pump cylinder when the piston moves upwardly.

The piston has a longitudinal passage 62 through which a suitable insulated conductor may extend. The piston rod at its upper end telescopes into the downwardly opening bore of a connector rod 65 and is rigidly secured thereto by a set screw 66 [,]. The connector rod has a radially outwardly extending rib 67 slidably disposed in a slot 68 of an inner retainer sleeve 70. The retainer sleeve is secured to the upper retainer nut 57 by the screws 71. The engagement of the longitudinal rib with the surfaces of the inner sleeve defining the slot prevents rotation of the connector rod, and therefore of the piston, and also limits longitudinal movement of the connector rod and the piston.

The upper enlarged end portion 75 of the connector rod extends slidably through a suitable bearing sleeve 76 rigidly secured to the retainer sleeve. The connector rod has an upwardly opening longitudinal threaded bore 78 in its upper end in which is threaded a drive screw 80. The upper end of the drive screw is connected by a suitable coupling 82 to the drive shaft 84 of a reversible constant speed direct current motor 86 which is also rigidly secured to the retainer sleeve.

The top housing section 36 at its upper end has a suitable passage 88 through which an insulated connector 90 may extend into the upper housing section. A suitable gasket or other seal means is provided to seal between the insulated conductor and the upper housing section. The insulated conductor 90 constitutes one part of the cable 91 and provides one side of an electrical circuit, the outer metallic sheath 92 of the cable comprising the other side of the circuit. The cable is looped through an aperture 93 of the upstanding lug 94 of the top housing section and secured by a suitable clamp 95 in such looped position so that the cable, which provides the electric conductors for transmitting electric current of high voltage to the motor of the injector device and for transmitting the ouput signals of the detector device to the surface, is also used to move the injector and detector apparatus in a well.

The connector rod 65 has an external lug 98 which is engageable with the operator button 99 of a normally open top limit switch 100 mounted in the inner sleeve to close the upper limit switch when the connector rod and the pump piston are in their uppermost positions. The connector rod lug is also engageable with the operator button 102 of a normally open lower limit switch 103, also mounted in the inner sleeve, to close the lower limit switch when the connector and the pump piston are in their lower-[cost] *most* positions.

It will now be seen that if the pump cylinder chamber or passage 51 below the piston flange 55 is filled with a liquid radioactive material and the pump piston is in its uppermost position relative to the pump cylinder, when the motor 86 is energized the drive shaft 84 is rotated in one direction and the rotation of the drive screw in the threaded bore of the connector rod causes the connector rod and the pump piston to be moved downwardly relative to the pump cylinder. As the pump piston moves downwardlly, one or more of the check valves 56 open as the pressure in the pump cylinder increases and the radioactive material is injected into the well. The amount of radioactive liquid injected into the well varies in accordance with the period of time that the constant speed motor is energized. When the direction of rotation of the drive shaft of the motor is reversed by reversing the direction of flow of current in its input circuit, its drive shaft is rotated in the opposite direction and the piston is moved upwardly. One or more of the check valves which permit flow of fluids into the pump cylinder below the piston opens to permit such [upwardly] *upward* movement of the piston as the pressure in the pump cylinder is decreased. The ports 61 of the pump cylinder permit entry and exhaust of fluids into and from the piston cylinder passage 51 above the piston flange during such downward and upward movement of the pump piston.

The radiation detector device 32 is secured to the inner sleeve a predetermined distance above and may be of the scintillation type having a scintillation crystal 112. When the radioactive material injected by the injector device is moved past the scintillation crystal, the detector device produces voltage pulses whose amplitude and frequency vary with the intensity and frequency of the radiation emanating from the radioactive material. The detector device is energized by a suitable battery which is disposed in the apparatus 30.

Referring now to FIGURE 2 of the drawing, the apparatus 30a which differs from the apparatus 30 only in having a second radiation detector device 32a, may be employed in the practice of the method of the invention to detect either upward or downward flow of radioactive material in the well after its injection thereinto by the injector device 31. The second detector device 32a is secured to a lower inner sleeve 70a whose upper end is telescoped over the lower retainer nut 57 of the injector device and is rigidly secured thereto in any suitable manner as by screws 71a. The inner sleeve 70a is of such length that the scintillation crystal 112a is spaced the same distance from the location of injection of the radioactive material through the check valve 56, as the scintillation crystal 112 of an upper detector device. The apparatus 30a having the two detector devices 32 and 32a spaced above and below the injector device 31 will detect the flow of radioactive material in either upward or downward direction in the well after its injection thereinto without the necessity of moving the apparatus in the well so that any very rapid movement of the radioactive material after it has been injected into the well can be easily detected by the apparatus 30a regardless of the direction in which the radioactive material is carried by the fluids flowing in the well.

The conductors by means of which direct current is supplied to the lower detector device and its output signals are transmitted to the insulated conductor 90 and the sheath 92 of the cable 91 extend past the various elements of the apparatus through suitable slots and passages and also through the longitudinal passage 62 of the piston 40. The output signals of the two detector devices 32 and 32a are in the form of sharp pulses of opposite polarities and the equipment 110 at the surface of the well to which the output signals of the two detectors are transmitted includes a discriminator 111 which separates the output signals of the two detector devices and transmits them to two separate recording instruments 114a and 114b each of which has a chart on which the recording device draws a line which corresponds to the signals received from its associated detector device. The motor 86 of the injector device is connectable across a direct current source 115 of high voltage located on the surface by means of a reversing switch 116, a suitable manually [ressettable] *resettable* circuit breaker 117 and the cable 91. When the movable switch contacts 120 and 121 of the reversing switch are moved to the positions wherein they engage its stationary contacts 122 and 123, the positive side of the battery is connected through the conductors 124 and 125, the contact 120, the conductor 126, the circuit breaker 117 and the conductor 127 to the insulated conductor 90 of the cable and the negative side of the battery is connected through the conductors 128 and 129, the contact 121, the conductor 130, the circuit breaker and the conductor 131 to the sheath 92 of the cable thus causing the current to flow in one direction through the motor. One side of the motor is connected to the conductor 90 through the conductor 132 and its other side is connected to the sheath 92 through the conductor 133, ground and the conductor 134. When the movable switch contacts 120 and 121 are moved to the position wherein they engage the other stationary contacts 135 and 136, respectively, of the reversing switch, the negative side of the battery is connected to the conductor 90 through the conductors 128 and 126, the circuit breaker and the conductor 117 and its positive side is connected to the sheath through the conductors 124 and 130, the circuit breaker 117 and the conductor 131. The electric current may thus be caused to flow in either direction through the motor and the direction of rotation of the motor be reversed.

The top limit switch 100 is connected in series with a diode 140 across the motor 86 while the lower bottom limit switch 103 is connected in series with a diode 141 across the motor. It will be apparent that when the motor is energized and the pump piston is moved to its uppermost position, the upper limit switch 100 is closed and short circuits the motor 86 thus causing an overload on the circuit breaker 117 which then opens and deenergizes the motor. The motor cannot be again energized until the switch 116 is moved to its opposite position to reverse the flow of current through the motor and the circuit breaker is manually reset. When the reversing switch is moved to its opposite position, the motor is not short circuited since even though the upper limit switch is now closed, the diode 140 prevents current flow in this opposite direction and the lower limit switch is open. As soon as the motor is again energized to move the pump downwardly, the upper limit switch 100 opens and the motor continues to run if the switch 116 is held closed until the lower limit switch 103 is closed. When this occurs, the motor is again short circuited through the lower limit switch and the diode 141 which conducts current in this opposite direction. The circuit breaker again opens and the motor cannot again be energized until the switch is moved to its other position and the circuit breaker is again reset.

The detector devices 32 and 32a are energized by a battery 143 which is mounted in the apparatus 30a, the negative side of the battery being connected to one side of each of the input circuits of the detector devices 32 and 32a by the conductors 144 and 145 and the positive side of the battery being connected to the other sides of the input circuits through ground. The output circuits of the detector devices are connected across the insulated conductor 90 and the sheath 92 of the cable 91 through the conductors 146 and 147 which are connected to the conductor 90 and the conductors 148 and 149 which are connected to ground and thus through the conductor 134 to the sheath 92. The circuits of the detector devices 32 and 32a are provided with suitable protective circuits which prevent the high voltage from the source 115 from damaging the components of the detector devices when the motor is energized by the high voltage of the surface *source* of direct current of high voltage 115. The detector devices 32 and 32a are in operation anytime that the motor is not in operation.

Referring now to FIGURE 1A, the injector and detector apparatus 30b is similar to the apparatus 30 differing therefrom only in that the injector apparatus 31b is located above the detector device 32b. The bottom housing section 40b is sufficiently long to enclose the detector device 32b and the inner sleeve 70b.

FIGURES 6 through 11 of the drawing illustrate one example of the method of the invention for investigating fluid flow in a well 150 into which water is introduced at the surface to flow into desired earth formations penetrated by the bore of the well below the lower end of the casing 151 to stimulate the production of another well 'hich also penetrates such formation. The method of :imulating production of one well by injecting water into nother well is termed "water flooding" and is well known › those skilled in the art. The well 150 is provided with ıe usual water flooding surface equipment 152 which ıcludes a well head 153 which opens to the annulus A etween the casing and the string of tubing T supported y the wellhead. A conduit or pipe 155 having a valve 56 connected therein opens to the annulus. Water is in-'oduced into the upper end of the tubing T by a conduit r pipe 158 which has a valve 159 connected therein. The pper end of the tubing is closable by a full opening valve 60 which provides communication between the upper nd of the tubing and the lower end of the usual lubri-ıtor 161 connected to the upper end of the tubing. The pper end of the lubricator is provided with a valve and :al assembly 162 which is openable to permit introduc-on of the injector and detector apparatus into the lubri-ıtor above the valve 160 and which seals between the exible line or cable 91 and the lubricator to permit ıovement of the line through the lubricator and the valve 60 when the latter is open without permitting escape of uid from the upper end of the tubing through the lubri-ıtor. The cable 91 extends over a direction changing ılley 170 and is movable by the usual power driven rum or winch 172. The sheath 92 and insulated con-uctor 90 of the cable are connected to the discriminator 11 by any suitable means, such as slip rings on the drum ›nnected to the conductor 90 and the sheath 92 and rushes engaged with the slip rings and connected to the :cording device. The recorders 114a and 114b may be f the usual well known type having a pen and a chart ıovable past the pen either at a constant or time drive or ı accordance with the movement of the flexible line in ıe well. The pen, of course, draws a line on the chart.

It has been discovered that after initiation of the intro-uction of the water into a well, the rates of flow of the ater into the various earth formations or strata pene-ated by the lower open hold portion of the well may ıry for a considerable period of time, and, therefore it necessary that such introduction or injection of water ɜ continued at the constant rate for a period of time ıfficiently long to ensure that the flow conditions in the ell are stabilized.

After the water has been introduced at such desired ›nstant rate for such period of time, an injector and de-:ctor apparatus, in this case, the apparatus 30b, is low-'ed into the well, while the introduction of the water into ıe well is continued without interruption or variation, y inserting the apparatus into the lubricator through the alve and sealing device 162 while the valve 160 is closed, ıoving the valve and sealing device into sealing engage-ıent with the cable 91, and then opening the flow open-ıg valve 160 to permit movement of the apparatus 30b ıto the upper end of the string of tubing to the position lustrated in FIGURE 6 wherein the check valves 56 of ıe ejector device are at 4895 feet and thus approximately ) feet above the lower end of the casing. The detector evice 32b is in operation since it is now energized by a attery in the apparatus. The chart drive of one of the :corders, e.g. the recorder 114a, is set to drive its chart ı accordance with the downward movement of the re-›rder in the well and the sensitivity of the recorder is :t at a high level. The other recorder is, of course in-perative. A log of the radiation emanating from the ırth formations and detected by the detector device 32b, produced on the chart so that by correlation of the revious gamma log 182 and the gamma ray log now ob-ined by the use of the detector device 32b, the exact lo-ıtion of the apparatus in the well may be determined. If :sired, a coupling collar locator may also be connected › the apparatus which by indicating the locations of the ›upling collars of the string of tubing as the apparatus is ıoved through the well, may also help to locate the ap-aratus in the well. After the location of the apparatus has been determined, the sensitivity of the recorder is lowered so that it will not then be responsive to the normal or background gamma ray radiation of the earth formations and the recorder is then moved through the portion of the well in which the investigation of the flow of the water is to be made and the base log 184 is recorded on the chart.

The apparatus 30b is then positioned at a location wherein the check valve 56 through which the radioactive material is injectable into the well is at a predetermined location above the bottom end of the casing, for example, at 4895 feet and the scintillation crystal of the detector device, which is exactly five feet below the check valve, is at 4900 feet in order to discover whether any channels, such as the channel 180 extends upwardly exteriorly of the casing since this condition occurs quite frequently. The chart of the recording is then placed on a constant or time drive and a heavy charge or slug of the radioactive material in the pump cyinder of the injector device, which may be a solution of water soluble I–131 material, is injected into the well by closing the switch 116 at the surface for a predetermined period of time to cause the motor 86 to rotate in such direction as to move the pump piston of the injector device downwardly in the pump cylinder. After the motor of the injector device is de-energized and the injection of the radioactive material is stopped, the chart is moved at a constant rate for a predetermined period of time, for example, two to four minutes, while the output signals of the detector device are recorded on the chart as shown in FIG. 7.

The output of the detector device 30b increases sharply as the injected radioactive material moves downwardly in the casing therepast with the downwardly flowing water approximately 10 seconds after the injection of the radioactive material into the well. This sharp increase in the output of the detector device as the slug of the radioactive material moves downwardly past the detector device is indicated at 200 on the chart. The radioactivity detected by the detector device and recorded by the recording device drops to a low value as the slug moves downwardly below the detector as indicated at 201 on the chart and then, as some of the water injected into the well flows upwardly in the channel 180 after flowing out the lower end of the casing and carries some of the radioactive material therewith upwardly past the detector, again increases as indicated at 202 on the chart. At this stage of the method it is determined that the channel 180 exists since some water must be flowing upwardly exteriorly of the casing and past the detector device. The radioactivity recorded by the recorder decreases slowly as the material which has flowed upwardly in the channel 180 exteriorly of the casing is flushed outwardly with the injected material into the earth formation at approximately the level of the detector device.

The recorder is then switched to depth correlation chart drive to cause the chart to move in accordance with the vertical movement of the apparatus 30b in the well. The apparatus is then run several times through the injected slug of material at predetermined time intervals, for example, 9 times or runs at intervals of two minutes to determine the locations of flow of water from the well into the earth formations penetrated by the well. The radioactivity detected by the detector device as it is moved upwardly through the injected slug of radioactive material during each run is recorded on the chart of the recording device as shown in FIGURE 8. The gradually decreasing radiation intensity in a zone A between 4890 and 4895 feet indicated at A1, A2 and A3 of the recordings of runs 1, 2 and 3, respectively, shows that water is flowing rapidly from the well into the zone and flushing the radioactive material outwardly from the well. The gradually diminishing radiation in zone B between 4930 feet and 4940 feet indicated at B1, B2, B3 and B4 of the recording of runs 1 through 4, respectively, shows that water is flowing from the well into an earth formation in that zone since a portion of the radioactive slug as it moved downwardly past this zone was moved outwardly thereinto. The gradually decreasing radiation intensity in a zone C between 4970 and 4980 feet indicated at C1 through C7 of the recordings of the runs 3 through 9, respectively, shows a similar flow of water from the well into the zone C and the decreasing radiation intensity in the zone D between 4995 and 5002 feet indicated at D1, D2, D3 and D4 of the recordings of runs 6 through 9, respectively, shows flow of water from the well into this zone. Increased radiation detected during run 3 in a zone E between 4958 and 4960 feet indicates a small rate of flow of water from the well into the earth formation at this location. The locations of the slug of radioactive material in the well at the times the detector device is run therepast is indicated by the sharp increases of detected radiation indicated at F1 through F7 of runs 1–7, respectively. The exact location of the slug during runs 8 and 9 cannot be determined from the recordings of these two runs.

The distance of downward movement of the slug of radioactive material in the well between successive runs of the apparatus 30b is of course indicative of the velocity of the water flowing in the well between the locations of the slugs at the time of making of the successive runs. For example, the slug of radioactive material, as indicated at F1 and F2 of the recordings of runs 1 and 2 moved from 4942 feet to 4955 feet during the two minutes which elapsed between the runs 1 and 2. Since the diameter of the well in this location is known, the rate of flow as well as the velocity of flow between these two locations can be easily determined. In this particular well 150, it was calculated to be approximately 188 barrels a day. Similarly, the rate of flow between 4955 feet and 4967 feet as indicated at F2 and F3 of the recordings of runs 2 and 3 was calculated to be 170 barrels per day. The difference in the rates of flow of water in the well above and past the zone E, indicated by the increased radioactivity intensity of run 3, shows loss of water into the earth formation at this zone.

Since the diameter of the well is not uniform in the zone C between 4968 and 4974 feet, the velocity of flow of the water in this zone cannot be accurately determined from the recordings of runs 3 and 4, which were made immediately before and after the period of time during which the slug was moving downwardly in the well at this zone, because of the turbulence created due to the changing diameter of the well at this location. The recordings of runs 4, 5 and 6, show that the water is flowing downwardly at the rate of 94 to 124 barrels per day between the zones C and D.

The step of the method which comprises making several runs at predetermined time intervals through the first slug of radioactive material injected into the well as it moves through the well thus indicates the locations of any earth formations penetrated by the well bore into which the injected water is flowing outwardly from the well bore and also provides approximate indications of the velocities and rates of flow of the water in portions of the well above and below such zones. In order to determine more accurately the rates of flow of water into the several formations or zones, as at the zones A, B, C, D and E, the method of the invention includes the subsequent steps of injecting successive slugs of radioactive material into the well while the apparatus is held stationary at locations immediately above and below each of the zones to determine very accurately the velocity and therefore the rate of flow above and below each such zone. As indicated in FIGURES 9 and 11, slugs 2 and 3 were injected into the well when the ejector device was between the zones C and D at 4984 and 4976 feet, respectively, and the detector device was at 4989 feet and 4981 feet, respectively. The recordings of the output of the detector device were, of course, made with the recorder on time drive and indicate that the ejected slugs in each case required approximately 67 to 75 seconds to move downwardly the five feet between the point of ejection and the scintillation crystal of the detector device. The diameter of the well being known at this location, the rate of flow of these locations were calculated to be 100 to 105 barrels per day. Slug 4 was injected into the well between the formations C and E and the recording made indicates that the water is flowing between formations E and C at the rate of 197 barrels indicating that some 92 (197—105) barrels per day are flowing into the earth formation C.

Slug 5 was injected into the well between the formations D and E and the recording of its movement [indicate] *indicates* that approximately 210 barrels per day are flowing between formations B and E so that the rate of flow of water into formation E is approximately 13 barrels (210—197) per day. Slugs 6 and 7 were injected into the well bore above the formation B and below the enlargement of the bore hole immediately below the lower end of the casing. The recordings of the movement of these slugs indicate that approximately 510 barrels are flowing in the well bore above the formation B thus indicating that approximately 300 barrels (510—210) of water per day are flowing into the formation B.

As indicated in FIGURES 9 and 10, slugs 2 and 3 were injected into the well when the apparatus 30b was stationary at the positions M and N, respectively, wherein the ejector device was between the zones C and D. The recordings of the output of the detector device were, of course, made with the recorder on time drive and indicate that the ejected slugs in each case required approximately 57 to 75 seconds to move downwardly 5 feet below the point of ejection to the scintillation crystal of the detector device. The diameter of the well being known at this location, the rate of fluid at this location was calculated to be 100 to 105 barrels of water per day. The apparatus was then moved upwardly to the position O between the formations C and E and the recording made when slug 4 was ejected indicate that the water was flowing between the formations E and C at the rate of 187 minus 197 barrels per day indicating that approximately 92 (197 minus 105) barrels per day are flowing into the earth formation or zone C.

The apparatus was then moved to the position P between the zones B and E the slug 5 injected into the well. The recording of the movement of slug 5 indicates that approximately 197 to 210 barrels per day are flowing between the formations B and E so that the rate of flow of water into the formation E is approximately 13 barrels (210 minus 197) barrels per day. The apparatus was then successively moved to the position Q and R and slugs 6 and 7 were successively ejected into the well bore above the formation B and below the enlargement of the bore hole immediately below the lower end of the casing. The recordings of the movement of these slugs indicate that approximately 510 barrels of water per day are flowing in the well bore above the formation B indicating that approximately 300 (510 minus 210) barrels per day are flowing into the formation B.

The apparatus was then moved to the position S and a heavy slug 8 injected into the casing at approximately the locations of the formation A. The recording of the movement of the slug 8 in the casing indicates that 800 barrels of water were flowing downwardly through the casing thus showing that there has been no loss through any leaks in the tubing or the casing thereabove and that approximately 290 (800—510) barrels of water per day are flowing into the zone A. Runs 10, 11 and 12 are then made as quickly as possible after a recording has been made of the movement of the slug through the casing in order to determine the exact location and thickness of the zone A before the radioactive material flows outwardly into such formation and is dissipated. The recordings of the runs 10, 11 and 12 indicate, at A4, A5 and A6 that the formation A is relatively shallow and extends between 4890 feet and 4895 feet.

The chart of FIGURE 11 presents graphically the information obtained by the above method and shows the rates of fluid flow in the well and into the several formations or zones.

Since the locations and rates of flow of water of the various zones into which the ejected water is flowing are now known, any such zone into which it is desired that the water not [flowing] *flow* may be sealed off. For example, the lower end of the channel 180 into which approximately 90 barrels of water per day are flowing may be sealed off by usual cementing apparatus and methods whereupon all of the water flowing into the well will flow into the other formations below the lower end of the casing.

It will now be seen that the method of the invention permits investigation of the velocity and rates of flow of fluids in the well, the locations of zones of earth formations into which the water pumped into the well is flowing and the rates at which it is flowing into each such formation or zone.

It will further be seen that the method requires only a single trip into the well with the ejector and detector apparatus 30b and includes the steps of ejecting material into the well bore while the recording device is on time drive and the apparatus is stationary in the well casing above its lower end until the ejected slug of radioactive material has sufficient time to flow downwardly in the well casing then upwardly if a channel is present exteriorly of the casing to determine whether the channel exists, moving the apparatus through the well bore and the slug of radioactive material as it moves downwardly through the well bore below the lower end of the casing while recorder is on depth correlation drive to detect locations of flow of the water and of the radioactive material into the earth formations, and then ascertaining the velocities of flow of the fluids in the well between the zones into which the water is flowing at locations of the well bore of uniform known diameter and thus permit calculations of the rates of flow between each pair of adjacent formations whereby the rates of flow of the fluids into each formation can be determined.

It will further be seen that if a previous step of the method has indicated a channel extending upwardly above the lower end of the casing the method includes the additional step of injecting a slug of radioactive material into the casing above the lower end thereof while the recorder is on time drive and then quickly making successive runs past the location of the indicated channel with the recorder on depth correlation drive to ascertain the exact location of the earth formation above the lower end of the casing to which water is flowing through such channel.

FIGURES 12 through 20 illustrate the method of the invention employing the double detector apparatus 30a for investigating fluid flow in a well into which water is being pumped at a constant rate, for example 910 barrels per day, through the tubing T and whose casing 151a extends a substantial distance below the lower end of the tubing T and is provided with three vertically spaced sets of perforations 301, 302 and 303, through which water injected into the well is to flow into the formations or zones at these levels. The gamma ray log 305 and the neutron log 306 (FIGURE 12) of the portion of the well in which the flow of water injected into the well is to be investigated which were made at the time of completion of the well are shown in FIGURE 12. Water is pumped at the constant rate into the tubing at the surface through the usual surface well head equipment, as illustrated in FIGURE 6, for a prolonged period of time, preferably at least 24 hours, in order that the rates of flow of the water into the earth formations through the perforations 301 in the casing below the lower end of the tubing are stabilized. Both the upper and lower detector devices 32 and 32a are not in operation, being powered by a suitable battery in the apparatus. One of the recording devices 114a and 114b is now made operative and its chart drive set at depth correlation and a log recording of the gamma radiation in the well is made as the apparatus is moved through the well in order to properly locate the apparatus in the well. A suitable coupling collar locator may also be connected to the apparatus 30a which, by detecting the coupling collars of the string of tubing T, in the usual way, helps in locating the apparatus in the well. The sensitivity of both recorders 114a and 114b is then lowered and the base log 307 obtained for the portion of the well in which the fluid flow is to be investigated. Both recorders 114a and 114b are then set on time drive and to a low sensitivity in order that they record only the radioactivity of the injected material. The apparatus is held stationary in the position t shown in FIGURE 12 wherein its check valve or valves 56 are at 5002.5 feet and its bottom [ejector] *detector* device 32a is above the upper end of the top set of perforations 301. The switch 116 is then closed to cause the motor 86 of the apparatus to move the piston of the ejector device downwardly and to eject a relatively heavy slug 1 of radioactive material into the casing above the top casing perforations 301. The [recordings] *recording* [310] *308* made by the bottom detector device 32a shown in FIGURE [3] *13* indicates at [311] *309* that the slug of radioactive material took approximately 9 seconds to travel the 5.5 feet between the [port] *point* of its injection and the scintillation crystal of the bottom detector device. The portion [312] *310* of the recording shows a slow return of the radioactivity to base level and thus indicates that some of the radioactive material may be carried through the top set of perforations to the exterior of the casing and then upwardly. This is confirmed by the recording [315] *311* of the radiation detected by the top detector 32 which at [316] *312* shows that at least some portion of the radioactive material has flowed upwardly exteriorly of the casing to at least 4997 feet.

If desired, one of the recorders may now be rendered inoperative and the chart drive of the other recorder is set on depth correlation drive. The apparatus 30a is then moved below the slug and recordings *made* of the radiation detected by one of the detector devices 32 or 32a during eight successive upwardly runs of the apparatus through the slug of radioactive material as it moves downwardly in the well. The recording of run 1 [slows] *shows* at A1 a slight radioactivity at approximately 4994 feet, which disappeared by the time run 2 was made and thus an outward flow of water into an earth formation or zone A at that level. The recordings of runs 1 and 2 indicate at B1 and B2 a slowly decreasing radiation and thus *indicate* outward flow of water into an earth formation or zone B at approximately 5014 to 5017 feet. The recordings of runs 2, 3 and 4 show at C1, C2 and C3 [show] a slowly decreasing radioactivity at approximately 5074 feet and thus outward flow of fluid into the zone C. The slowly decreasing radiation between the bottom and middle sets of perforations 303 and 302 shown in the recordings of runs 3, 4 and 5 indicates some communication between these sets of perforations exteriorly of the well casing. The slowly decreasing radiation shown at D1, D2, D3 and D4 of the recordings of runs 5 through 9 indicates that some water is flowing downwardly exteriorly of the casing below the bottom of the perforations and into an earth formation D at approximately 5108 feet.

Since the internal diameter of the well casing is known and since the velocities of movement of the slug in the casing above the top set of perforations and between the locations of the slug at successive runs, for example between F1 and F2 indicated on the recordings of runs 1 and 2, the rates of flow of the fluids in the casing and between such points can be determined in the same manner described above in connection with the method illustrated in FIGURES 6 through 11.

The recording of the radiation detected by the bottom detector device when the apparatus was in the position *t* shows the water to be flowing at the rate of 910 barrels per day in the casing above the top set of perforations. The velocity of movement of the slug 1 through the casing between the time of its ejection and the making of run 1 indicates that approximately 495 barrels per day are flowing out of the casing at or near the top set of perforations. The velocity of movement of the slug during the time between the runs 2 and 3 from F2 to F3 [is] in the recordings of runs 2 and 3, indicates that approximately 75 barrels of water per day are flowing out of the casing through the middle set of perforations 302. Similarly the movement of the slug during the time between runs 3 and 4 from F3 to F4 in the recordings of runs 3 and 4, indicates that approximately 170 barrels of water per day are flowing out of the casing through the uppermost of the bottom set of perforations. The remainder of the water is flowing downwardly, probably outside of the casing, to the zone D at 5108 feet.

Figure 15:
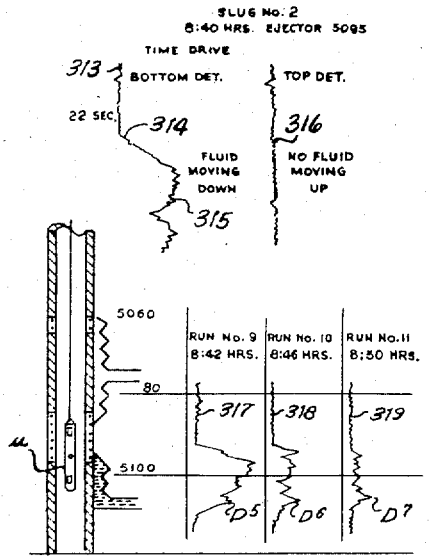
FIGURES 15, 16, 17, 18, 19 and 20 are schematic harts of the radioactivity detected by the detector device f the apparatus after successive slugs of radioactive ma-rial have been ejected into the well at predetermined dif-rent locations in the well during predetermined periods f time after the ejection of the [lugs] *slugs* and during ibsequent movements of the apparatus through each such ug.

The apparatus 30a is then moved to the location u shown in FIGURE 15 wherein the ejector check valves 56 are located at 5095 feet and therefore slightly above the lowermost of the bottom set of perforations 303.

The two recorders are set on time drive and a second slug 2 of radioactive material is injected into the well with the apparatus held stationary. The recording [310] *313* of the radioactivity detected by the bottom detector device at [311] *314* shows an increasing radioactivity approximately 22 seconds after the injection of the radio active material into the well. The slow erratic decrease in radiation shown at [312] *315* of this recording indicates that some of the water is flowing downwardly and probably exteriorly of the casing. The [recordings] *recording* [313] *316 o*f the radioactivity detected by the top [ejector] *detector* device 32 shows that none of the ejected radioactive material has flowed upwardly.

One recorder is then switched to depth correlation drive while the other recorder is rendered inoperative. The apparatus is then lowered in the well in the casing below the ejected slug and then recordings [315, 316] *317, 318* and [317] *319* are made of the radiation detected by one of the detector devices during three successive runs 9, 10 and 11 of the apparatus made upwardly at two minute intervals through the slug of radioactive material. These recordings at D5, D6 and D7 show that radioactive material is moving downwardly with the water below the lowermost of the bottom set of perforations to a depth of 5108 feet and then upwardly into the zone D.

Figure 16:
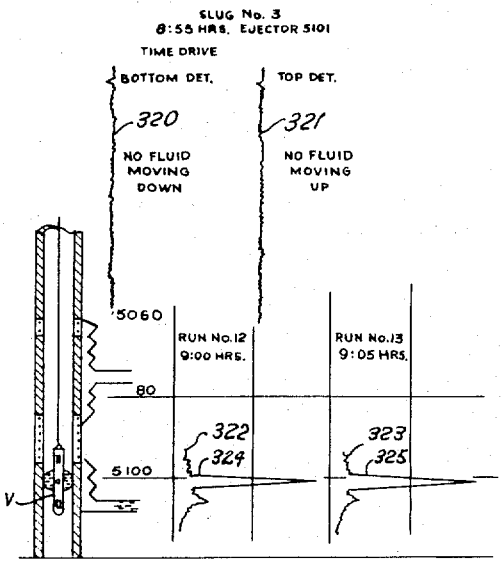

The apparatus 30a is then moved to the position [u] *v* as shown in FIGURE 16, the chart drives of both the recorders are set on time drive and the third slug 3 of radioactive material is injected into the well below the lowermost of the bottom set of perforations. The recordings [320 and 321] *321 and 320* of the radioactivity detected by the top and bottom detector devices 32 and 32a, respectively, show that the ejected slug has not moved either upwardly or downwardly during a considerable period of time, for example, approximately 5 minutes. One recorder is then rendered inoperative, the chart drive of the other is set at depth correlation drive and runs 12 and 13 are made with the apparatus through the slug of radioactive material. The recordings 322 and 323 made during runs 12 and 13 show *at* 324 and 325, respectively, that the slug of radioactive material is stationary in the well casing below the bottom set of perforations. Since the radioactive material is shown to be static at 5100 feet by the recordings 322 and 323, the radioactive material shown by previous recordings to be at 5108 feet is now known to be located exteriorly of the casing.

Figure 17:
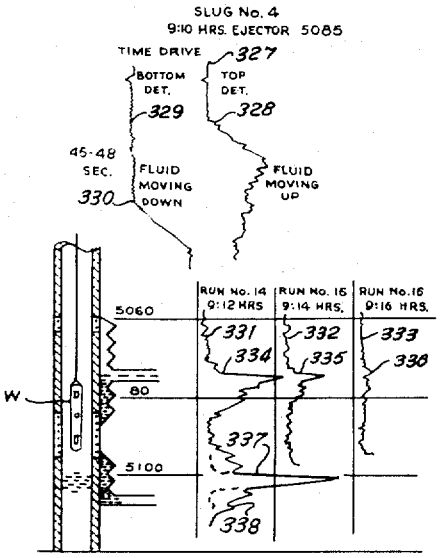

The apparatus is then moved to the position *w* shown in FIGURE 17, the recorders are set on timed drive, and while the apparatus is held stationary, an additional slug 4 of radioactive material is injected into the well below the topmost of the bottom set of perforations. The recording 327 of the radiation detected by the top detector device 32 shows at 328 an increasing radiation approximately 18 to 20 seconds after the injection indicating that some of the radioactive material injected into the casing has flowed outwardly thereof, and water is moving upwardly outside of the casing. The recording 329 of the radiation detected by the bottom detector device 32a indicates at 330 that some of the injected material reaches the bottom detector device approximately 45 to 48 seconds after its injection into the well. This velocity of flow indicates that approximately 170 barrels of water per day are moving downwardly at the location of the bottom detector device and are known to be flowing outwardly through the lowermost set of perforations since the recordings 320, 321, 322 and 323 have shown that no fluid is flowing downwardly in the casing below the bottom set of perforations. The apparatus is lowered below the slug of radioactive material and the recordings 331, 332 and 333 are made during upward runs 14, 15 and 16 of the apparatus through the slug. These recordings show at 334, 335 and 336 an increased radiation which decreases very rapidly and thus indicate that water flowing outwardly through the uppermost of the bottom set of perforations is flowing upwardly to the formation C at approximately 5074 and that this outward flow of water is quite rapid. Run 14 at 337 again indicates that the slug 3 is stationary in the casing and at 338 the outward flow of water into the formation D.

Figure 18:
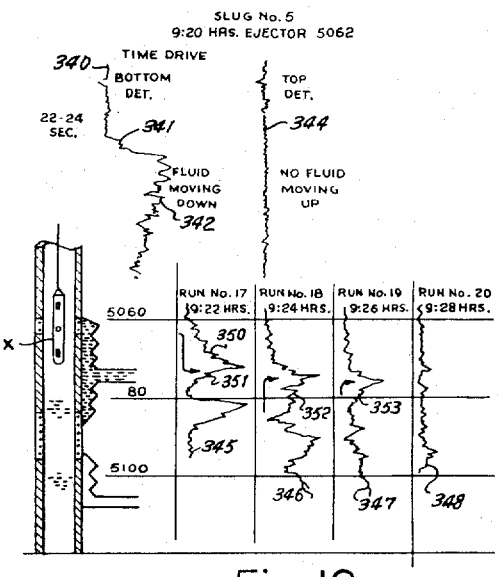

The apparatus is then positioned at the position *x* illustrated in FIGURE 18. The chart drives of the recorder devices are again set on time drive and a fifth slug 5 of radioactive material is injected into the well at the location of the top set of perforations. The recording 340 of the radiation detected by the bottom detector device shows that water is flowing downwardly in the well casing taking approximately 22 to 24 seconds as indicated at 341, to reach the bottom detector device and that the water is moving downwardly in the casing at the rate of approximately 340 barrels per day. The slow decrease in radiation at 342 of the recording 340 indicates that some of the water which has flowed outwardly through the middle set of perforations 302 is flowing downwardly exteriorly of the casing. The recording 344 of the radioactivity detected by the top detector device shows that no fluids are flowing upwardly exteriorly of the casing. One of the recorders is then rendered inoperative, the chart drive of the other detector device is set on depth correlation drive, the apparatus is lowered below the ejected slug 5 and the recordings 345, 346, 347 and 348 are then made during upward runs 17, 18, 19 and 20 of the apparatus through the casing and the slug 5. The recording 345 indicates at 350 that water and radioactive material carried therewith is flowing outwardly through the middle perforations and that the fluid is flowing downwardly from the middle perforations and exteriorly of the casing to the zone C, at 351 of the recording a 5074 feet. The recordings 346 and 347 at 352 and 353, respectively, indicate that water flowing out of the casing through the uppermost of the bottom perforations at approximately 5084 feet is flowing upwardly exteriorly of the casing to the zone C.

Figure 19:
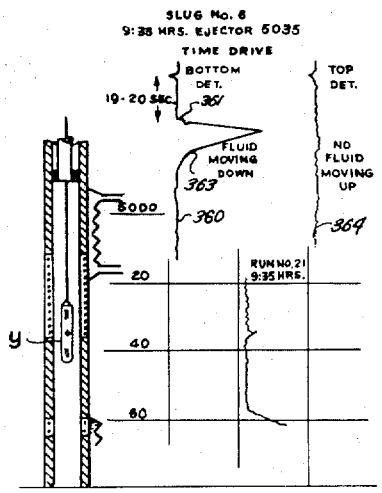

In order to determine if the middle set of perforations is in communication with the top set of perforations, the apparatus is moved to the position *y* shown in FIGURE 19. The recorders were set on time drive and a slug 6 of radioactive material was injected into the casing immediately above the lowermost of the top set of perforations. The [recordings] *recording* 360 of the radiation detected by the bottom detector device indicate at 361 that the slug of radioactive material took approximately 19 to 20 seconds to reach the bottom detector device and that approximately 420 to 435 barrels of water per day are flowing downwardly in the casing at this location. The rapid decrease in the radiation as at 363 indicates that none of the radioactive material has flowed outwardly of the casing. The recording [362] *364* of the radiation detected by the top detector device shows no upward flow f fluids. One of the recorders is then set on depth correla-on drive and run 21 is made through the casing. The :cording of the radiation detected during this run indi-ıtes that no downward channeling is taking place ex-:riorly of the well casing.

Figure 20:
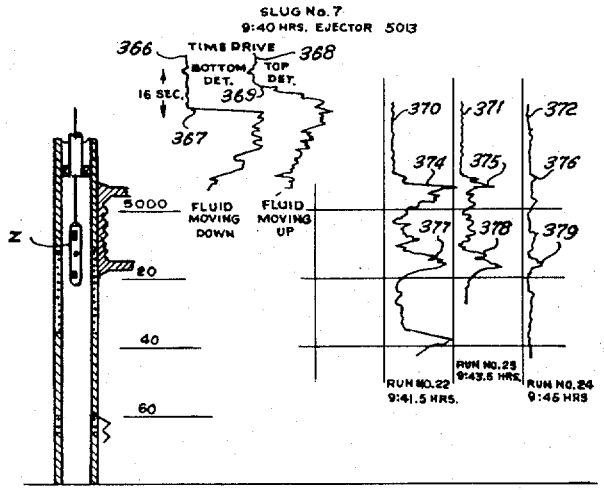
Figure 22:
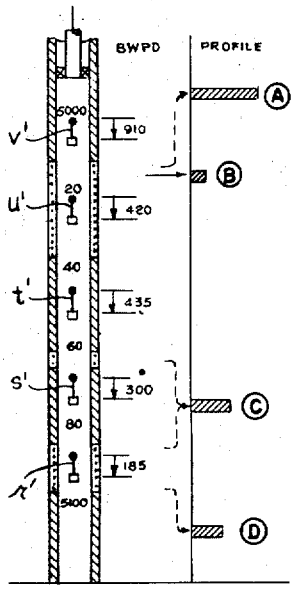
Figure 21:
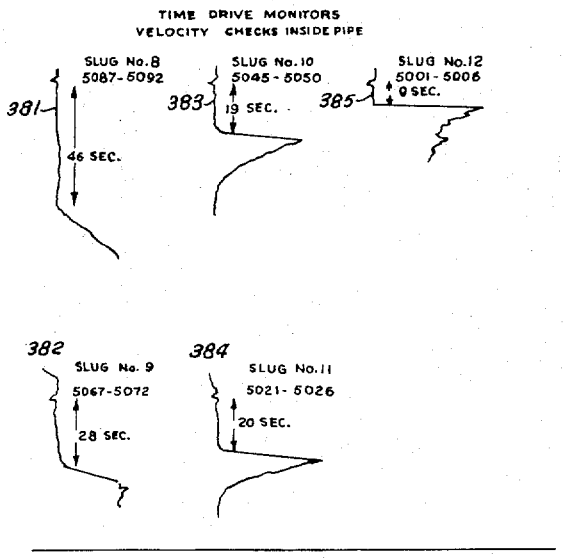
FIGURE 21 is a chart of the recordings of the radiation etected by a detector device of the apparatus after the jection of radioactive material into the well at the dif-rent locations in the well illustrated in FIGURE 2; and, FIGURE 22 is a schematic chart showing the rates of ow of water in different locations in the well and into arious formations penetrated by the well.

The apparatus was then moved to the position *z* illus-ated in FIGURE 20 with the recorders set on time drive, nd a heavy slug was injected into the well at the upper-ıost of the top set of perforations. The recording 366 of ıe radiation detected by the bottom detector device indi-ates, at 367, that it took approximately 16 seconds [to] *or* [take] the slug to reach the bottom detector device nd thus indicates a downward flow at the rate of approxi-ıately 515 barrels per day in the casing from 5013 feet, ıe location of the discharge check valves 56 of the ejector ump, to 5018.5 feet, the location of the scintillation crys-ıl of the bottom detector device 32[A]*a*. The recording 68 of the radiation *detected by the upper detector 32* in-icates at 369 that some of the injected radioactive ma-:rial flowed outwardly *and upwardly* exteriorly of the asing and that this material [reach] *reached* the top etector device 32 before any portions of the radioactive ıaterial [reach] *reached* the bottom detector device, ıowing that the fluids are flowing at a more rapid rate pwardly exteriorly of the casing than downwardly inside ıe casing.

The recorders were then set on depth correlation drive nd the recordings 370, 371 and 372 made during upward ıns of the apparatus through the casing. Recordings 370, *71* and [371] *372* show at 374 and 375 and 376 a rapidly ecreasing radiation at 4994 feet which indicates rapid out-'ard flow of the water flowing upwardly exteriorly of the asing and outwardly into the zone A and at 377, 378 and 79 indicate a similar flow of water outwardly in the zone ; at 5014–5018 feet.

The above described steps of the method of investigat-ıg fluid flow in a well have revealed the locations of the ones A, B, C and D into which water is flowing, that 'ater is flowing into the formations A and B through the ɔp set of perforations, that water is flowing into the one C from the middle set of perforations and also from ıe uppermost of the bottom set of perforation, and ıat water is flowing into the zone D through the lower-ıost of the bottom set of perforations.

In order to determine accurately the velocities of flow f water in the casing between the locations of outwardly ow from the casing, the apparatus is successively placed ı the positions r1, s1, t1, u1 and v1 and slugs 8 through 2 of the radioactive material are injected successively ıto the well, [respectively,] and the recordings 381, 382, 83, 384 and 385, *respectively*, of the radiation detected y the bottom detector device 32a are obtained while the pparatus is held stationary at these positions. The veloc-ies of fluid flow in the casing above and below the loca-ons of outward flow of water from the casing now being nown, the rate of flow of water into the various forma-ons *or* zones A–B can now be calculated since the in-ernal diameter of the casing is of course known.

Such calculations show that 185 barrels of water per ay are flowing downward between the uppermost and ɔwermost perforations of the bottom set of perforations, ıat 300 barrels of water per day are flowing between the ıiddle and bottom sets of perforations, that 435 barrels f water per day are flowing between the top and middle :ts of peforations and the 910 barrels of water per day re flowing in the casing above the top set of perfora-ons. The discrepancy between the rates of flow as de-ermined by the movement of the slugs 10 and 11 is prob-bly due to turbulence at the location 41 which is at the lo-ıtion of perforations. The velocity between the top and ıiddle sets of perforations of the casing as determined by ug 11 is probably correct.

It is now known that approximately 185 barrels of 'ater per day are flowing through the lowermost of the ɔttom set of perforations into the zone D and that 115 barrels (300 minus 185) of water per day are flowing into the formation C through the uppermost of the perforations. The recordings of slugs 9 and 10 indicate that 135 barrels of water per day (435 minus 300) are flowing through the middle set of perforations and then downwardly to zone C. The total rate of flow of water into zone C is therefore 250 barrels of water per day.

Since the velocity of the slug, when the apparatus was at the position *z* as shown in FIGURE 20, was shown to be approximately 515 barrels of water per day and the rate of flow between the top and bottom perforations shown to be 435 gallons per day, approximately 80 barrels of water per day (515 minus 435) flow outwardly into the formation B and 395 barrels of water per day (910 minus 515) are flowing through the uppermost *of the* top set of perforations and then exteriorly of the casing into the top formation A.

If it is necessary to determine the velocity of flow at locations in the well of excessive turbulence, so that the timing of the movement of the ejected slug of radioactive material does not provide an accurate indication of the velocity of flow of the water, a flow meter of the type illustrated and described in the patent to H. M. Buck et al., 2,856,006, may be positioned at such location and the exact rate of flow at such locations may then be determined by such flow meter.

It will now be seen that the method of the invention using the detector device which has a single detector 32b positioned below its ejector device 31b and the method of the invention using the apparatus 30a, which has detector devices above and below the ejector device 31, each includes the step of ejecting a tracer material into the well in a flow conductor above the locations at which it is expected that water introduced continuously at a constant rate into the well is flowing outwardly into earth formations penetrated by the well, and detecting the direction of flow of the ejected tracer material by stationary detector device during a predetermined period of time after its ejection into the well.

It will further be seen that the method includes the subsequent steps of making a plurality of runs with the detector device through the well and the slug of radioactive material to determine the locations of outward flow of the tracer material in a predetermined portion of the well, then determining the velocity of flow of the fluids in the well between the locations of outward flow of fluids from the casing by ejecting successive slugs of the tracer material into the well at these locations and then detecting their velocities of flow at such locations.

It will also be seen that in the event the fluid flow outwardly from the well through perforations in a flow conductor or casing or through the lower open end of the flow conductor and then flow exteriorly upwardly or downwardly of the casing, successive slugs of radioactive material are ejected into the well at or adjacent such locations and their direction and rate of movement is determined to discover both upward and downward flow of such fluids exteriorly of the casing.

It will be seen that the velocities of flow of the water in the casing above each location of outward flow thereof are determined by ejecting slugs of the radioactive material above successively higher locations in order that each suceeding slug is ejected upstream prior after the prior slug and it is not necessary to wait for the flushing out of the previous slug of radioactive material.

It will further be seen that while the method of the invention for investigating fluid flow in a well and the earth formations penetrated thereby has been described in connection with the injection of water into the well and thence into earth formations penetrated thereby that the method may be employed to investigate fluid flow in the well from a single formation or during simultaneous production of well fluids from several earth formations.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. The method of investigating in a well the flow of water introduced in the well and into earth formations penetrated by the well including: introducing water at a constant rate for a predetermined period of time sufficiently long to cause stabilization of water flow into the earth formations and during the investigation; positioning a detector device in the well above the expected locations of outward flow of water into the earth formations; introducing a quantity of tracer material into the well a predetermined distance above the detector device; determining by the output of the detector device the period of time required for the tracer material to move past the detector after its introduction into the well; and then moving the detector device successively in the well and through the tracer material as it moves downwardly in the well to determine locations of outward flow of the tracer material from the well.

2. The method of investigating in a well the flow of water introduced in a well and into earth formations penetrated by the well including: introducing water at a constant rate for a predetermined period of time sufficiently long to cause stabilization of its flow into the earth formations and during the investigation; positioning a detector device in [a] *the* well above the expected locations of the outward flow of water into the earth formations; introducing slug of tracer material into the well a predetermined distance above the detector device; determining from the output of the detector device the period of time required for the slug to move the predetermined distance; moving the detector device through the slug as it moves downwardly in the well to determine locations of outward flow of the tracer material from the well; and then placing the detector device successively at positions above each location of outward flow and ejecting a slug of tracer material a predetermined distance above the detector device at each of said positions and determining the period of time for each slug to reach the detector device after its ejection.

3. The method for investigating flow of fluids in a well of known bore including: positioning in the well an apparatus having an ejector device for ejecting a radioactive material and a detector device spaced a predetermined distance from the ejector device for detecting the radiation emanating from the radioactive [matrial] *material* as it moves therepast; ejecting a predetermined quantity of the radioactive material and determining the length of time required for the ejected material to move to said detector device while holding the apparatus stationary; and moving the detector device at *a plurality of successive* predetermined time intervals through the well and the *said* ejected radioactive material to discover locations of outward flow of the radioactive material from the well.

4. The method for investigating flow of fluids in a well of known bore including: positioning in the well an apparatus having an ejector device for ejecting a radioactive material and a detector device spaced a predetermined distance from the ejector device for detecting the radiation emanating from the radioactive material as it moves therepast; ejecting a predetermine dquantity of the radioactive material and determining the length of time required for the ejected material to move to said detector device while holding the apparatus stationary; moving the detector device at *a plurality of successive* predetermined time intervals through the well and the *said* ejected radioactive material to discover locations of [ourtward] *outward* flow of the radioactive material from the well; and placing the apparatus successively in position above each location of outward flow and ejecting a slug of radioactive material at *each such position* and determining the period of time required for the slug to reach the detector device to determine the velocity of flow of the tracer of radioactive material above each formation to permit calculation of the rates of flow of fluids into each of said formations.

5. The method of investigating the flow of water in a well having a flow conductor through the conductor and into earth formations penetrated by the well including: introducing at the surface water into the flow conductor at a constant rate for a predetermined period of time sufficiently long to cause stabilization of water flow into the earth formations; positioning an apparatus in the flow conductor above the uppermost of the expected locations of the flow of water from the flow conductor, the apparatus including a detector device and an ejector device positioned a predetermined distance above the detector device, the detector device providing an output signal which varies in accordance with the radiation detected thereby; ejecting a predetermined quantity of the radioactive material by use of the ejector device; recording the output of the detector device during a predetermined time interval after the ejection of the radioactive material to determine the length of time required for the ejected material to move past said detector device; and then moving the apparatus through the slug of radioactive material and recording the output of the detector device as it moves through the well to determine the locations of outward flow of the radioactive material from the well.

6. The method of investigating the flow of water in a well having a flow conductor through the conductor and into earth formations penetrated by the well including: introducing at the surface water into the flow conductor at a constant rate for a predetermined period of time sufficiently long to cause stabilization of water flow into the earth formations; positioning an apparatus in the flow conductor above the uppermost of the expected locations of the flow of water from the flow conductor, the apparatus including a detector device and an ejector device positioned a predetermined distance above the detector device, the detector device providing an output signal which varies in accordance with the radiation detected thereby; ejecting a predetermined quantity of the radioactive material by use of the ejector device; recording the output of the detector device during a predetermined time interval after the ejection of the radioactive material to determine the length of time required for the ejected material to move past said detector device; then moving the apparatus through the slug of radioactive material and recording the output of the detector device as it moves through the well to determine the locations of outward flow of the radioactive material from the well; then placing the apparatus successively at positions above each indicated location of outward flow and ejecting a slug of the radioactive material at each of said positions and recording the output of the detector device to determine the period of time necessary for each slug of radioactive material to reach the detector device after its ejection.

7. A method for investigating flow of water in a well having a flow conductor extending from the surface to a position above the earth formations penetrated by the well into which water is to be introduced, the method including: introducing water at a constant rate for a predetermined period of time into the flow conductor at the surface to cause stabilization of water flow into the earth formations; positioning an apparatus a predetermined distance above the lower end of the flow conductor, the apparatus including an ejector device for ejecting radioactive material and a detector device positioned below the ejector device which provides an output signal which varies in accordance with the intensity of radiation at the location of the detector device; ejecting a slug of radioactive material into the flow conductor and recording the output signal of the detector device for a predetermined period of time sufficiently long to permit the movement of the slug of radioactive material downvardly past the detector device and through the lower open end of the flow conductor and then upwardly exteriorly of the flow conductor through any channel which may be present exteriorly of the flow conductor and again past the detector device to determine the velocity of flow, of the fluid downwardly through the flow conductor and to determine if upward flow exteriorly of the flow conductor is occurring; and moving the apparatus successively in the well through the slug of radioactive material as it moves downwardly in the well while recording the output signal of the detector device to determine the locations of outward flow of water from the well.

8. A method for investigating flow of water in a well having a flow conductor extending from the surface to a position above the earth formations penetrated by the well into which water is to be introduced, the method including; introducing water at a constant rate for a predetermined period of time into the flow conductor at the surface to cause stabilization of water flow into the earth formations; positioning an apparatus a predetermined distance above the lower end of the flow conductor, the apparatus including an ejector device for ejecting radioactive material and a detector device positioned below the ejector device which provides an output signal which varies in accordance with the intensity of radiation at the location of the detector device; ejecting a slug of radioactive material into the flow conductor and recording the output signal of the detector device for a predetermined period of time sufficiently long to permit the movement of the slug of radioactive material downwardly past the detector device and through the lower open end of the flow conductor and then upwardly exteriorly of the flow conductor through any channel which may be present exteriorly of the flow conductor and again past the detector device to determine the velocity of flow of the fluid downwardly through the flow conductor and to determine if upward flow exteriorly of the flow conductor is occurring; moving the apparatus successively in the well through the slug of radioactive material as it moves downwardly in the well while recording the output signal of the detector device to determine the locations of outward flow of water from the well; and positioning the apparatus above each location of outward flow and ejecting a slug of radioactive material into the well at each such location while recording the output signal of the detector device to determine the velocities of flow of the water above each such location of outward flow.

9. A method of investigating flow of water in a well having a conductor extending from the surface through the well and having longitudinal spaced perforations through which water may flow outwardly into earth formations penetrated by the well, the method including: introducing water at a constant rate for a predetermined period of time into the flow conductor at the surface to cause stabilization of water flow into the earth formations; positioning an apparatus a predetermined distance above the uppermost of the perforations including an ejector device for ejecting radioactive material into the well and an upper and a lower detector device positioned above and below the ejector device which provide output signals which vary in accordance with the intensity of radiation at the locations of the detector devices; ejecting a slug of radioactive material into the flow conductor from the ejector device and recording the output signals of the detector devices for a predetermined period of time sufficiently long to determine the movement of the slug of radioactive material downward past the lower detector device and through perforations of the flow conductor and then upwardly and exteriorly of the flow conductor through any channels which may be present exteriorly of the flow conductor and communicating with such [perforation] *perforations* and past the detector devices to determine the velocity *of* flow of the [fluid] *fluids* downwardly through the flow conductor and to determine if upward *flow of* fluids exteriorly of the flow conductor is taking place; and moving the apparatus successively in the well through the ejected slug of radioactive material as it moves downwardly in the well while recording the output signal of at least one of the detector devices to determine the locations of outward flow of water from the well through the perforations.

10. A method of investigating flow of water in a well having a conductor extending from the surface through the well and having longitudinal spaced perforations through which water may flow outwardly into earth formations penetrated by the well, the method including: introducing water at a constant rate for a predetermined period of time into the flow conductor at the surface to cause stabilization of water flow into the earth formations; positioning an apparatus a predetermined distance above the uppermost of the perforations including an ejector device for ejecting radioactive material into the well and an upper and lower detector device positioned above and below the ejector device which provides output signals which vary in accordance with the intensity of radiation at the locations of the detector devices; ejecting a slug of radioactive material into the flow conductor from the ejector device and recording the output signals of the detector devices for a predetermined period of time sufficiently long to determine the movement of the slug of radioactive material downward past the lower detector device and through perforations of the flow conductor and then upwardly and exteriorly of the flow conductor through any channels which may be present exteriorly of the flow conductor and communicating with such perforations and past the detector devices to determine the velocity *of* flow of the fluids downwardly through the flow conductor and to determine if upward *flow of* fluids exteriorly of the flow conductor is taking place; moving the apparatus successively in the well through the ejected slug of radioactive material as it moves downwardly in the well while recording the output signal of at least one of the detector devices to determine the locations of outward flow of water from the well through the perforations; and positioning the apparatus above each location of outward flow and ejecting a slug of radioactive material into the well at each such location while recording the output signals of the detector devices to determine the directions and velocities of flow of the water above each such location of outward flow and any flow exteriorly of the flow conductor.

*11. The method of investigating in a well the flow of water introduced in the well and into earth formations penetrated by the well including: introducing water at a constant rate for a predetermined period of time sufficiently long to cause stabilization of water flow into the earth formations and during the investigation; positioning a pair of longitudinally spaced upper and lower detector devices in the well above the expected locations of outward flow of water into the earth formations; introducing a quantity of tracer material into the well between the detector devices at a predetermined distance above the lower detector device; determining by the output of the lower detector device the period of time required for the tracer material to move past the lower detector device after its introduction into the well; determining from the output of the upper detector device if upward flow of fluids is taking place from the point of outward flow of water into the earth formations; and then moving the detector devices successively in the well and through the tracer material as it moves downwardly in the well to determine locations of outward flow of the tracer material from the well.*

*12. The method for investigating flow of fluids in a well of known bore including: positioning in the well an apparatus having an ejector device for ejecting a radioactive material and a pair of longitudinally spaced upper and lower detector devices each spaced a predetermined distance respectively above and below the ejector device for detecting the radiation emanating from the radioactive*

*material as it moves therepast; ejecting a predetermined quantity of the radioactive material and determining the length of time required for the ejected material to move to each said detector device while holding the apparatus stationary to determine the velocity of flow of said ejected material and the direction of such flow; and moving the detector devices at a plurality of successive predetermined time intervals through the well and the said ejected radioactive material to discover locations of outward flow of the radioactive material from the well.*

*13. The method of investigating the flow of fluids in a well having a flow conductor and in earth formations penetrated by the well including: introducing at the surface water into the flow conductor at a constant rate for a predetermined period of time sufficiently long to cause stabilization of water flow into the earth formations; positioning an apparatus in the flow conductor above the uppermost of the expected locations of the flow of water from the flow conductor, the apparatus including a pair of longitudinally spaced detector devices and an ejector device positioned between said detector devices a predetermined distance above the lower detector device, the detector devices each providing an output signal which varies in accordance with the radiation detected thereby; ejecting a predetermined quantity of the radioactive material by use of the ejector device; recording the output of each of the detector devices during a predetermined time interval after the ejection of the radioactive material to determine the length of time required for the ejected material to move past said lower detector device; determining from the output of the upper detector device if upward flow of the ejected material is taking place exteriorly of the flow conductor; then moving the apparatus through the slug of radioactive material and recording the output of one of the detector devices as it moves through the well to determine the locations of outward flow of the radioactive material from the well; then placing the apparatus successively at positions above each indicated location of outward flow and ejecting a slug of the radioactive material at each of said positions and recording the output of the lower one of the detector devices to determine the period of time necessary for each slug of radioactive material to reach said lower one of the detector devices after its ejection.*

*14. Method of investigating flow of fluids in a well having a conductor extending from the surface through the well and having longitudinal spaced perforations through which water may flow outwardly into earth formations penetrated by the well, the method including: introducing water at a constant rate for a predetermined period of time into the flow conductor at the surface to cause stabilization of water flow into the earth formations; positioning at a predetermined distance above the uppermost of the perforations an apparatus including an ejector device for ejecting radioactive material into the well and an upper detector device positioned above said ejector device and a lower detector device positioned a predetermined distance below the ejector device, each of which detector devices provides output signals which vary in accordance with the intensity of radiation at the locations of the detector device; ejecting a slug of radioactive material into the flow conductor from the ejector device and recording the output signals of the detector devices for a predetermined period of time sufficiently long to permit the movement of the slug of radioactive material downward past the lower detector device and through perforations of the flow conductor into the earth formations and upwardly and exteriorly of the flow conductor through any channels which may be present exteriorly of the flow conductor and communicating with such perforations and past the detector devices; determining the velocity of flow of the fluids downwardly through the flow conductor; determining from the output of the upper detector device if upward flow of fluids exteriorly of the flow conductor is taking place; and moving the apparatus successively in the well through the ejected slug of radioactive material as it moves downwardly in the well while recording the output signal of at least one of the detector devices to determine the locations of outward flow of water from the well through the perforations.*

*15. A method of investigating flow of fluids in a well having a conductor extending from the surface through the well and having longitudinal spaced perforations through which water may flow outwardly into earth formations penetrated by the well, the method including: introducing water at a constant rate for a predetermined period of time into the flow conductor at the surface to cause stabilization of water flow into the earth formations; positioning at a predetermined distance above the uppermost of the perforations an apparatus including an ejector device for ejecting radioactive material into the well and an upper detector device positioned above said ejector device and a lower detector device positioned a predetermined distance below the ejector device, each of which provides output signals which vary in accordance with the intensity of radiation at the location of the detector device; ejecting a slug of radioactive material into the flow conductor from the ejector device and recording the output signals of the detector devices for a predetermined period of time sufficiently long to permit the movement of the slug of radioactive material downward past the lower detector device and through perforations of the flow conductor into the earth formations and upwardly and exteriorly of the flow conductor through any channels which may be present exteriorly of the flow conductor and communicating with such perforations and past the detector devices; determining from the output of the lower detector device the velocity of flow of the fluids downwardly through the flow conductor; determining from the output of the upper detector device if upward flow of fluids exteriorly of the flow conductor is taking place; moving the apparatus successively in the well through the ejected slug of radioactive material as it moves downwardly in the well while recording the output signal of at least one of the detector devices to determine the locations of outward flow of water from the well through the perforations; and positioning the apparatus above each location of outward flow and ejecting a slug of radioactive material into the well at each such location while recording the output signals of the detector devices to determine the directions and velocities of flow of water above each such location of outward flow and any flow exteriorly of the flow conductor.*

*16. A method of investigating flow of fluids in a well having a conductor extending from the surface through the well and having longitudinally spaced perforations through which water may flow outwardly into earth formations penetrated by the well, the method including: introducing water at a constant rate for a predetermined period of time in the flow conductor at the surface to cause stabilization of water flow into the earth formations; positioning an apparatus a predetermined distance above the uppermost of the perforations including an ejector device for ejecting radioactive material into the well and an upper detector device spaced a predetermined distance above said ejector device and a lower detector device positioned at a predetermined distance below the ejector device, each of which detector devices provides output signals which vary in accordance with the intensity of radiation at the location of said detector devices; and ejecting a slug of radioactive material into the flow conductor from the ejector device and recording the output signals of both the detector devices for a predetermined period of time sufficiently long to determine the movement of the slug of radioactive material downwardly past the lower detector device and through perforations of the flow conductor and then upwardly and exteriorly of the flow conductor*

*hrough any channels which may be present exteriorly of he flow conductor and communicating with such perfora-ions and past the detector devices to determine the elocity of flow of the fluids downwardly through the flow onductor and to determine by means of the signals of he upper detector device if upward flow fluids exteriorly f the flow conductor is taking place.*

References Cited

The following references, cited by the Examiner, are of ecord in the patented file of this patent or the original atent.

UNITED STATES PATENTS

| | | | |
|---|---|---|---|
| 2,453,456 | 11/1948 | Piety | 250—106 ILX |
| 2,599,975 | 6/1952 | Carpenter | 250—43.5 FCX |
| 2,617,941 | 11/1952 | Craggs | 250—106 ILX |
| 2,700,734 | 1/1955 | Egan et al. | 250—43.5 |
| 3,255,347 | 6/1966 | Cobb et al. | 250—43.5 |

ARCHIE R. BORCHELT, Primary Examiner

U.S. Cl. X.R.

73—155; 250—106 L